United States Patent
Takahashi

(10) Patent No.: US 8,311,173 B2
(45) Date of Patent: Nov. 13, 2012

(54) FRAME PULSE SIGNAL LATCH CIRCUIT AND PHASE ADJUSTMENT METHOD

(75) Inventor: Tsugio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 946 days.

(21) Appl. No.: 12/369,879

(22) Filed: Feb. 12, 2009

(65) Prior Publication Data

US 2009/0207960 A1 Aug. 20, 2009

(30) Foreign Application Priority Data

Feb. 15, 2008 (JP) .................. 2008-035007

(51) Int. Cl.
*H04L 7/00* (2006.01)
(52) U.S. Cl. ........ 375/355; 375/354; 375/362; 375/371; 375/372; 375/376
(58) Field of Classification Search .................. 375/355, 375/362, 371, 372, 376, 354
See application file for complete search history.

(56) References Cited

U.S. PATENT DOCUMENTS

| 5,642,386 A * | 6/1997 | Rocco, Jr. ...................... 375/355 |
| 7,076,377 B2 * | 7/2006 | Kim et al. ........................ 702/66 |
| 7,315,594 B2 * | 1/2008 | Schmatz et al. ............... 375/355 |

FOREIGN PATENT DOCUMENTS

JP 1994303226 A 10/1994

* cited by examiner

*Primary Examiner* — Ted Wang

(57) ABSTRACT

While a phase of an output clock signal is varied, an input frame pulse is latched based on the output clock signal. Then, by using an output frame pulse, which is a result of the latching, generation of a racing state, which is caused by the phase relation between the output clock signal and the output frame pulse, is detected. Next, a phase adjustment amount is determined so that the phase of the output clock signal of the moment when the racing state is generated is shifted by a period corresponding to half a cycle of the output clock signal.

4 Claims, 12 Drawing Sheets

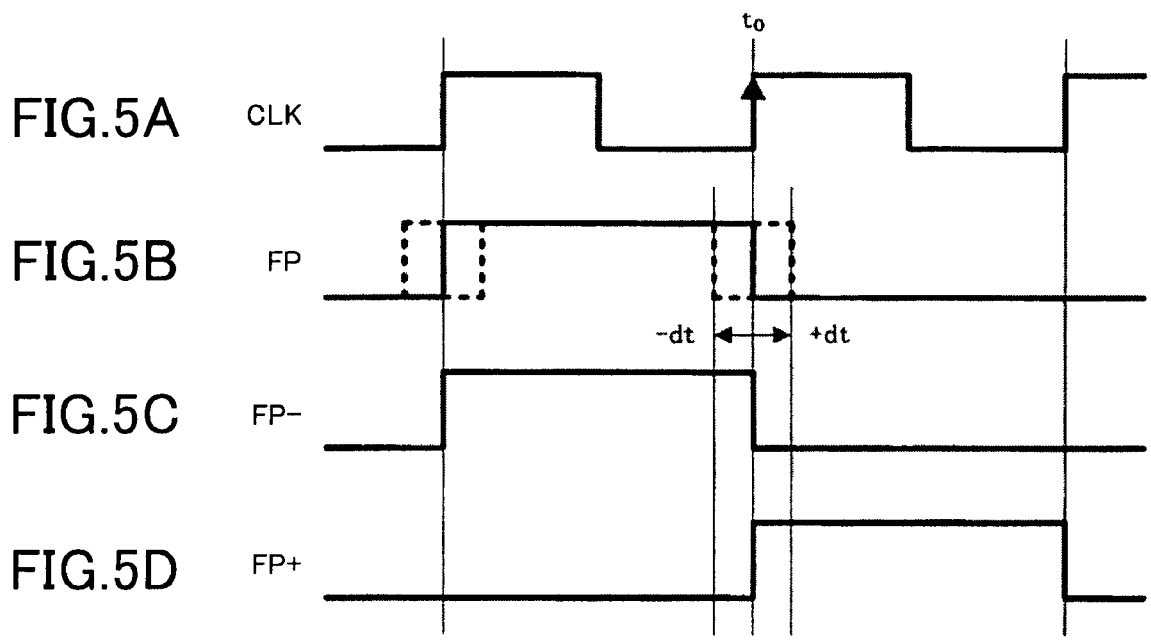

FRAME PULSE SIGNAL LATCH CIRCUIT AND PHASE ADJUSTMENT METHOD

BACKGROUND OF THE INVENTION

This application is based on Japanese Patent Application No. 2008-035007 filed on Feb. 15, 2008 and including specification, claims, drawings and summary. The disclosure of the above Japanese Patent Application is incorporated herein by reference in its entirety.

FIELD OF THE INVENTION

The present invention relates to a frame pulse signal latch circuit and a phase adjustment method and, more particularly, to a frame pulse signal latch circuit which latches a frame pulse signal based on a clock signal and a phase adjustment method of adjusting the phase of the clock signal used for latching the frame pulse signal.

DESCRIPTION OF THE RELATED ART

Along with increase of the integration degree and the processing speed of an electronic circuit, the frequency of a system clock signal used in control of the electronic circuit is increasing. Accordingly, when digital signals are to be transferred between printed wiring boards or devices, the permissible errors about the phase variation of the digital signals are becoming stricter.

Generally, when a digital signal is to be transferred by using a clock signal, for example, when a frame pulse signal or the like which is cyclically varied is to be transferred, a synchronization clock signal having a high frequency is transmitted from a transmitting side in parallel with the frame pulse signal. Then, when the frame pulse signal is latched by using the clock signal in a receiving side, a frame pulse signal synchronized with the clock signal is generated.

In a latch circuit which latches the frame pulse signal, when a variation point of the frame pulse signal and the latch timing according to the clock signal are overlapped with each other, a racing state that the rise timing of the latched frame pulse signal is varied forward or backward by the amount corresponding to one clock is generated. In this case, the latch circuit can no longer generate the frame pulse signal having the original cycle. Therefore, various methods for avoiding the occurrence of the racing state have been proposed (for example, see Unexamined Japanese Patent Application KOKAI Publication No. H06-303226 as referred to "Patent Literature 1" afterward).

However, in the method described in Patent Literature 1, when the phase variation that is caused along with transfer of digital signals is to be adjusted, the delay amount of a clock signal has to be determined after a unique phase variation amount is perceived in advance as a phase variation amount between a frame pulse signal and a clock signal. Therefore, there is a disadvantage that long time is required for designing and adjustment of devices.

In a latch circuit, in order to shorten the time taken until the phase is optimized, the shorter the wiring length of the printed wiring board, the better. Therefore, designing of a printed wiring board of a latch circuit is generally difficult. Furthermore, the higher the frequency of the system clock signal becomes, the stricter the phase errors permitted in the printed wiring board.

SUMMARY OF THE INVENTION

The present invention has been accomplished under the above described circumstances, and an object of the present invention is to provide a frame pulse signal latch circuit and a phase adjustment method which enable reliable latching of a frame pulse signal.

According to a first aspect, the present invention is a frame pulse signal latch circuit having: a racing detection unit which detects a racing state generated due to phase relation between a frame pulse signal and a first clock signal for latching the frame pulse signal; a phase control unit which determines a phase adjustment amount for adjusting a phase of the first clock signal based on the phase and the cycle of the first clock signal when the racing state is detected by the racing detection unit; a phase adjustment unit which generates the first clock signal by adjusting a phase of an input second clock signal in accordance with the phase adjustment amount determined by the phase control unit; and a latch unit which latches the frame pulse signal based on the first clock signal generated by the phase adjustment unit and generates an output frame pulse signal.

According to a second aspect, the present invention is a phase adjustment method including: a step of detecting a racing state generated due to phase relation between a clock signal, which is used for latching a frame pulse signal, and the frame pulse signal; and a step of determining a phase adjustment amount for adjusting the phase of the clock signal based on the phase and the cycle of the clock signal when the racing state is detected.

BRIEF DESCRIPTION OF THE DRAWINGS

These objects and other objects and advantages of the present invention will become more apparent upon reading of the following detailed description and the accompanying drawings in which:

FIG. 5A to FIG. 5D are diagrams for explaining the phase relation between a clock signal and a frame pulse signal;

DETAILED DESCRIPTION OF THE PREFERRED EMBODIMENTS

Next, embodiments of the present invention will be explained with reference to drawings.

First Embodiment

Figure 1:
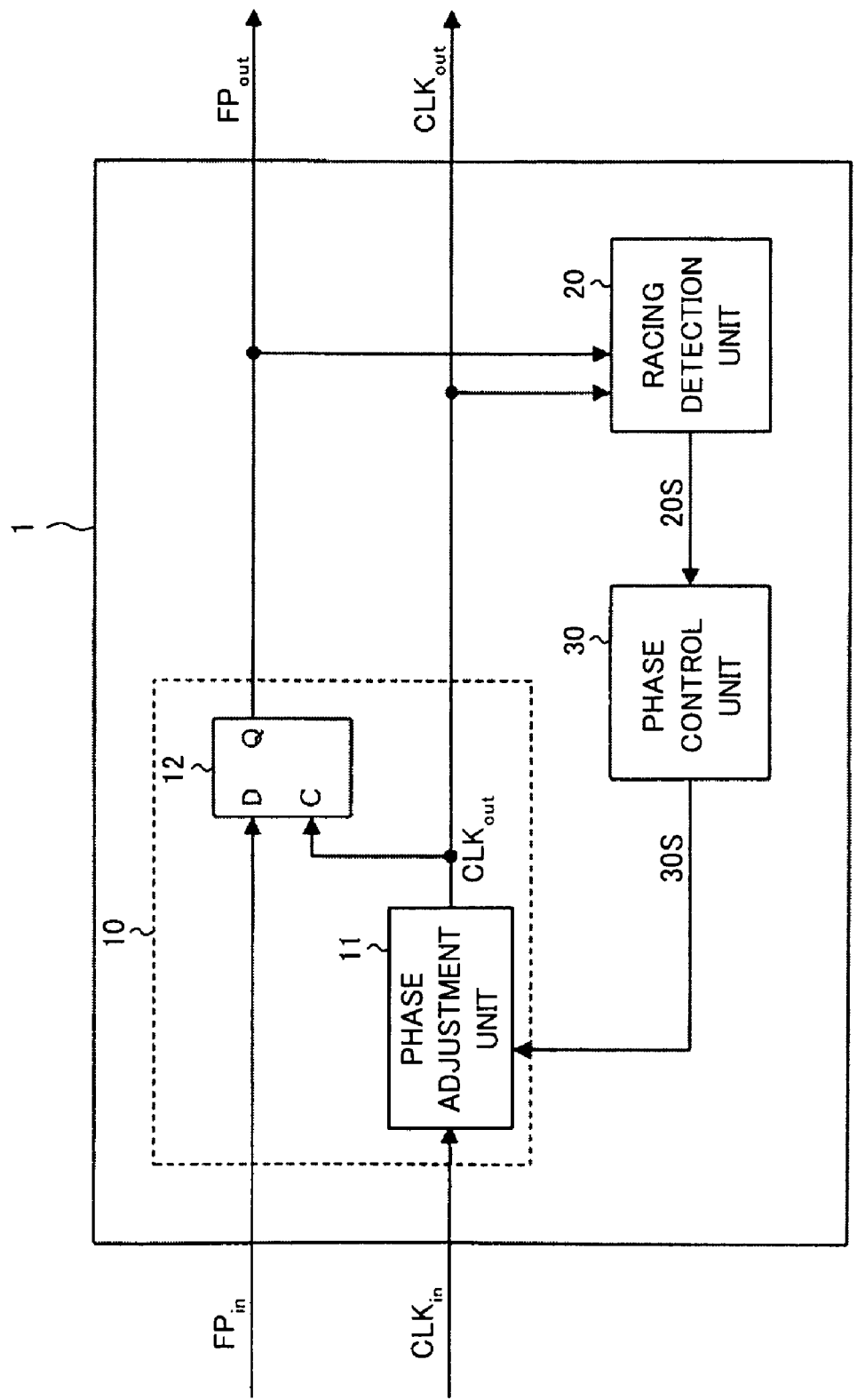
FIG. 1 is a block diagram showing a configuration of a frame pulse signal latch circuit according to a first embodiment of the present invention.

First, with reference to FIG. 1, a frame pulse signal latch circuit 1 according to a first embodiment of the present invention will be explained. FIG. 1 is a block diagram showing a configuration of the frame pulse signal latch circuit 1 according to the first embodiment of the present invention.

The frame pulse signal latch circuit 1 according to the present embodiment is a device, which latches an input frame pulse signal $FP_{in}$ at optimal timing based on an output clock signal $CLK_{out}$ obtained by adjusting the phase of an input clock signal $CLK_{in}$. The frame pulse signal latch circuit 1 has a phase adjustment circuit 10, a racing detection unit 20, and a phase control unit 30.

The phase adjustment circuit 10 has a phase adjustment unit 11 and a latch unit 12. The phase adjustment unit 11 adjusts the phase of the input clock signal $CLK_{in}$ based on a signal 30S, which is output from the phase control unit 30, and outputs the signal as the output clock signal $CLK_{out}$. The phase adjustment unit 11 comprises a PLL circuit, and the like.

The latch unit 12 latches the input frame pulse signal $FP_{in}$ based on the output clock signal $CLK_{out}$ and then outputs an output frame pulse signal $FP_{out}$ of which phase is shifted with respect to the input frame pulse signal $FP_{in}$. The latch unit 12 comprises, for example, a flip-flop, or the like.

The racing detection unit 20 detects a racing state, which is generated due to the phase relation between the output frame pulse signal $FP_{out}$ and the output clock signal $CLK_{out}$. Then, the racing detection unit 20 outputs a signal 20S, which is at a high level for example when the racing state is detected.

The phase control unit 30 selects different phase adjustment amounts sequentially and outputs the signal 30S, which includes the information about the selected phase adjustment amount, to the phase adjustment unit 11. When the racing state is detected by the racing detection unit 20, for example when the signal 20S is at the high level, the phase control unit 30 determines an optimal phase adjustment amount for latching the input frame pulse signal, based on the selected phase adjustment amount. Then, the phase control unit 30 outputs the signal 30S, which includes the optimal phase adjustment amount, to the phase adjustment unit 11.

Figure 2:
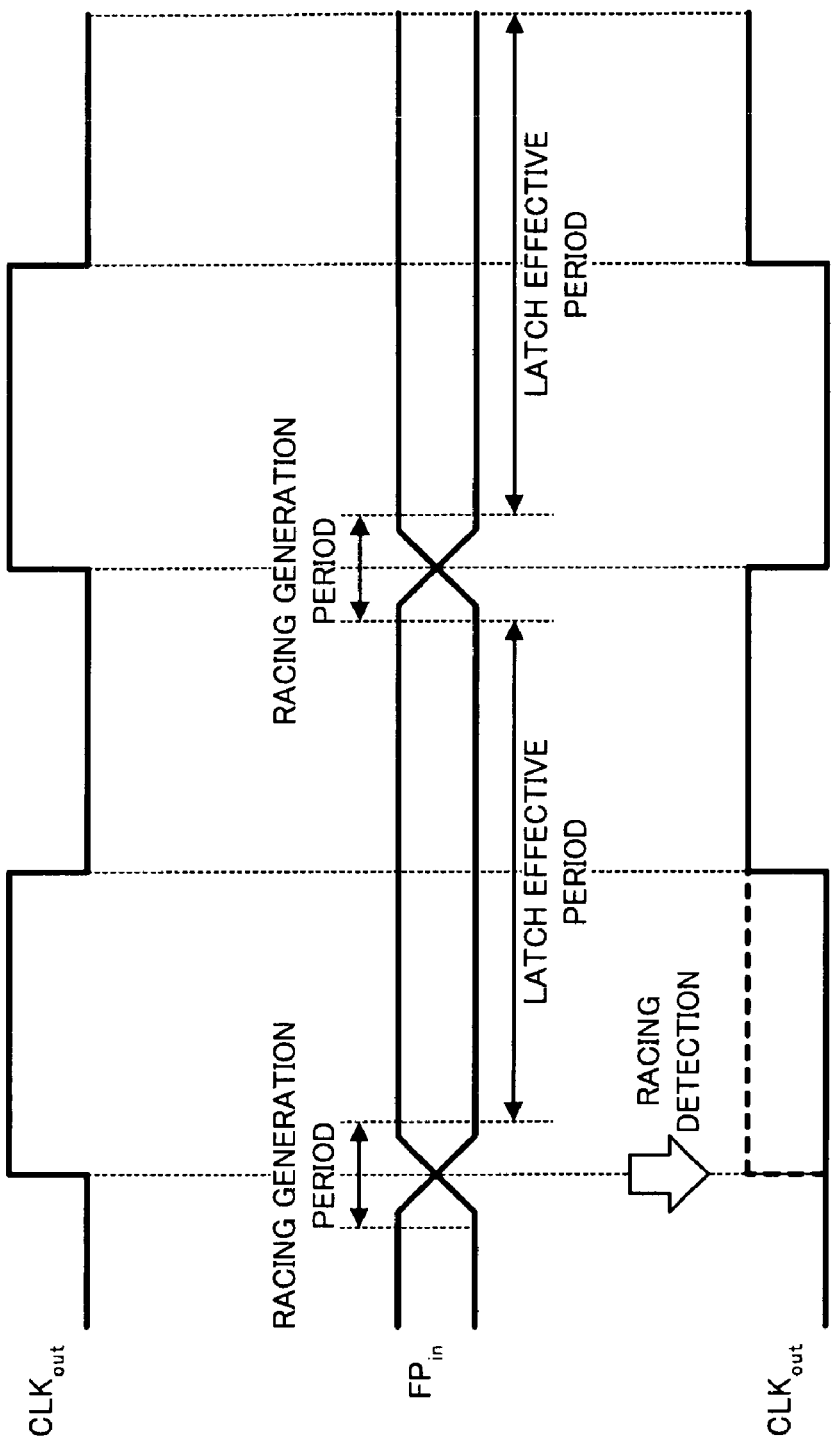
FIG. 2A to FIG. 2C are diagrams showing a clock signal $CLK_{out}$ before phase adjustment, a frame pulse signal $FP_{in}$, and a clock signal $CLK_{out}$ after phase adjustment, respectively.

FIG. 2A to FIG. 2C are diagrams showing the clock signal $CLK_{out}$ before phase adjustment, the frame pulse signal $FP_{in}$, and the clock signal $CLK_{out}$ after phase adjustment, respectively. As is understood when FIG. 2A and FIG. 2B are taken into consideration, the state in which a variation point of the input frame pulse signal $FP_{in}$ and rise (latch timing) of the output clock signal $CLK_{out}$ are approximately overlapped with each other is called the racing state. In the racing state, sometimes the output timing of the output frame pulse signal $FP_{out}$, which is output as a latch result, is varied by the period corresponding to one clock in each latch. Then, as a result, sometimes the frame cycle of the output frame pulse signal $FP_{out}$ is varied by the period corresponding to one clock.

The racing state is generated in a period around the rise timing of the output clock signal $CLK_{out}$, and the period length thereof is 100 to 200 psec, which is significantly short. This period is referred to as a racing generation period. In the period other than the racing generation period, the input frame pulse signal $FP_{in}$ can be stably latched. This period is referred to as a latch effective period.

The frame pulse signal latch circuit 1 according to the present embodiment sequentially varies the phase adjustment amount for adjusting the phase of the input clock signal $CLK_{in}$ in the phase adjustment circuit 10 so as to generate the racing state. Then, based on the phase adjustment amount of the case in which the racing state is generated, the optimal phase adjustment amount for stably latching the input frame pulse signal $FP_{in}$ is determined.

Figure 3:
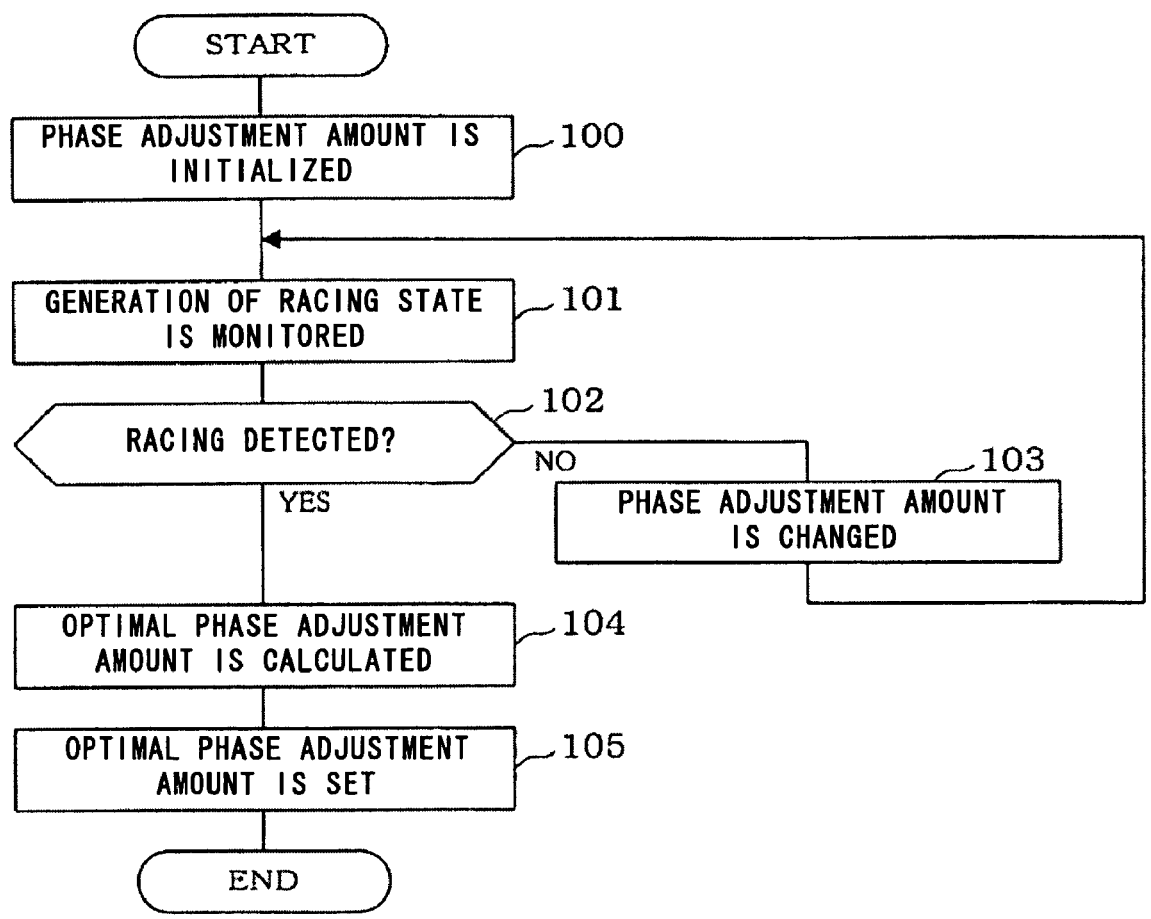
FIG. 3 is a flow chart for explaining an operation of the frame pulse signal latch circuit according to the first embodiment of the present invention.

Hereinafter, based on FIG. 3, an operation of the frame pulse signal latch circuit 1 according to the first embodiment of the present invention will be explained. FIG. 3 is a flow chart for explaining the operation of the frame pulse signal latch circuit according to the first embodiment of the present invention.

In accordance with an initialization signal (not shown) such as a reset signal indicating start of a phase adjustment operation, the phase control unit 30 outputs the signal 30S including the information which causes the phase adjustment amount to be zero. Consequently, the phase adjustment amount by the phase adjustment unit 11 is set to zero (step 100).

As a result, the output clock signal $CLK_{out}$ having a zero phase-difference with respect to the input clock signal $CLK_{in}$ is output from the phase adjustment unit 11. The latch unit 12 latches the input frame pulse signal $FP_{in}$ based on the output clock signal $CLK_{out}$ and outputs the signal as the output frame pulse signal $FP_{out}$.

The racing detection unit 20 monitors whether the racing state is generated or not, for example, during the period around rise of the output clock signal $CLK_{out}$ (step 101).

Herein, when the signal 20S does not become the high level, for example, during a detection period over a predetermined number of frames (step 102: NO), the phase control unit 30 outputs the signal 30S including the information about a target phase adjustment amount, which is obtained by varying the current phase adjustment amount by a predetermined degree. Consequently, the phase adjustment amount in the phase adjustment unit 11 is changed to the target phase adjustment amount (step 103). Subsequently, until the determination of step 102 is affirmed, the processes from step 101 to step 103 are repeated.

On the other hand, when the signal 20S becomes the high level during the above described detection period (step 102: YES), the phase control unit 30 calculates the phase adjustment amount for shifting the phase of the current output clock signal $CLK_{out}$ by half a cycle (step 104). Specifically, when the racing state is generated, an optimal phase adjustment amount is calculated by adding or subtracting a phase, which is corresponding to half the cycle of the output clock signal $CLK_{out}$, to or from the selected phase adjustment amount. Then, the signal 30S including the information about the optimal phase amount is output, and the phase adjustment amount of the phase adjustment unit 11 is set to the optimal phase adjustment amount (step 105). The phase adjustment unit 11 adjusts the phase of the input clock signal $CLK_{in}$ based on the optimal phase adjustment amount and generates and outputs the output clock signal $CLK_{out}$. The phase of the output clock signal $CLK_{out}$ is the phase shifted by the period corresponding to half the cycle from the phase of the moment when the racing state is generated.

When the latch effective period of the input frame pulse signal $FP_{in}$ approximately corresponds to one cycle of the output clock signal $CLK_{out}$ as shown in FIG. 2B, at the point when the racing state is generated, the rise/decay timing of the input frame pulse signal $FP_{in}$ and the rise timing of the output clock signal $CLK_{out}$ are approximately matched with each other. Therefore, the output clock signal $CLK_{out}$ that is obtained by carrying out phase adjustment based on the optimal phase adjustment amount rises at middle timing between the rise timing and the decay timing of the input frame pulse signal $FP_{in}$. Therefore, when the input frame pulse signal $FP_{in}$ is latched in synchronization with the output clock signal $CLK_{out}$ that is adjusted based on the optimal phase adjustment amount, a stable latch operation can be realized.

Note that the optimal phase adjustment amount is not necessarily required to cause the rise timing of the clock signal $CLK_{out}$ to be at the middle point between the rise timing and the decay timing of the input frame pulse signal $FP_{in}$. The output clock signal $CLK_{out}$ is merely required to rise within the latch effective period.

As explained above, in the present embodiment, the optimal phase adjustment amount is set based on the phase adjustment amount of the moment when the racing state is generated. Therefore, the phase of the clock signal for latching the frame pulse signal can be automatically adjusted without carrying out evaluation or adjustment of the circuit in advance.

The phase adjustment of the clock signal is carried out by sequentially varying the phase adjustment amount of the clock signal. Therefore, the latch timing can be adjusted without being affected by the individual characteristics of the printed wiring board or characteristics unique to the circuit. Therefore, the board, circuit, and the like are not required to be subjected to evaluation or adjustment of phase shift in advance, and the work burden required for, for example, designing, fabrication, quality management, and the like, of the printed wiring board or the circuit can be significantly reduced. Particularly, even if it is a printed wiring board for a high-frequency band in which the frequency of the clock signal is high, restrictions imposed on pattern designing can be extremely reduced.

In the present embodiment, the optimal phase adjustment amount is set based on the phase adjustment amount of the moment when the racing state is detected. Therefore, the time required until the racing state is detected is, on average, merely half the cycle of the clock signal, i.e., the time that is required to change the phase of the output clock signal $CLK_{out}$ by 180 degrees. Therefore, compared with the case in which the optimal phase of the clock signal is found by changing by the period corresponding to one cycle of the clock signal, in other words, changing the phase of the output clock signal $CLK_{out}$ by 360 degrees, the optimal phase of the output clock signal $CLK_{out}$ can be found in short time. As a result, the time required for phase adjustment of the clock signal is shortened.

The racing state is generated merely within the very short period; therefore, the phase adjustment amount of the case in which the racing state is generated is uniquely determined. Therefore, the rise phase of the clock signal that is adjusted based on the phase adjustment amount is also uniquely determined. Therefore, phase adjustment can be readily automated. The frame pulse signal latch circuit according to the present embodiment does not need a restriction in terms of designing in which the phase variation amount upon designing is suppressed to minimum by providing a restriction on the wiring length of the printed wiring board, for example, in order to finish evaluation in short time. Therefore, the degree of freedom of printed wiring board design is expanded.

Second Embodiment

Figure 4:
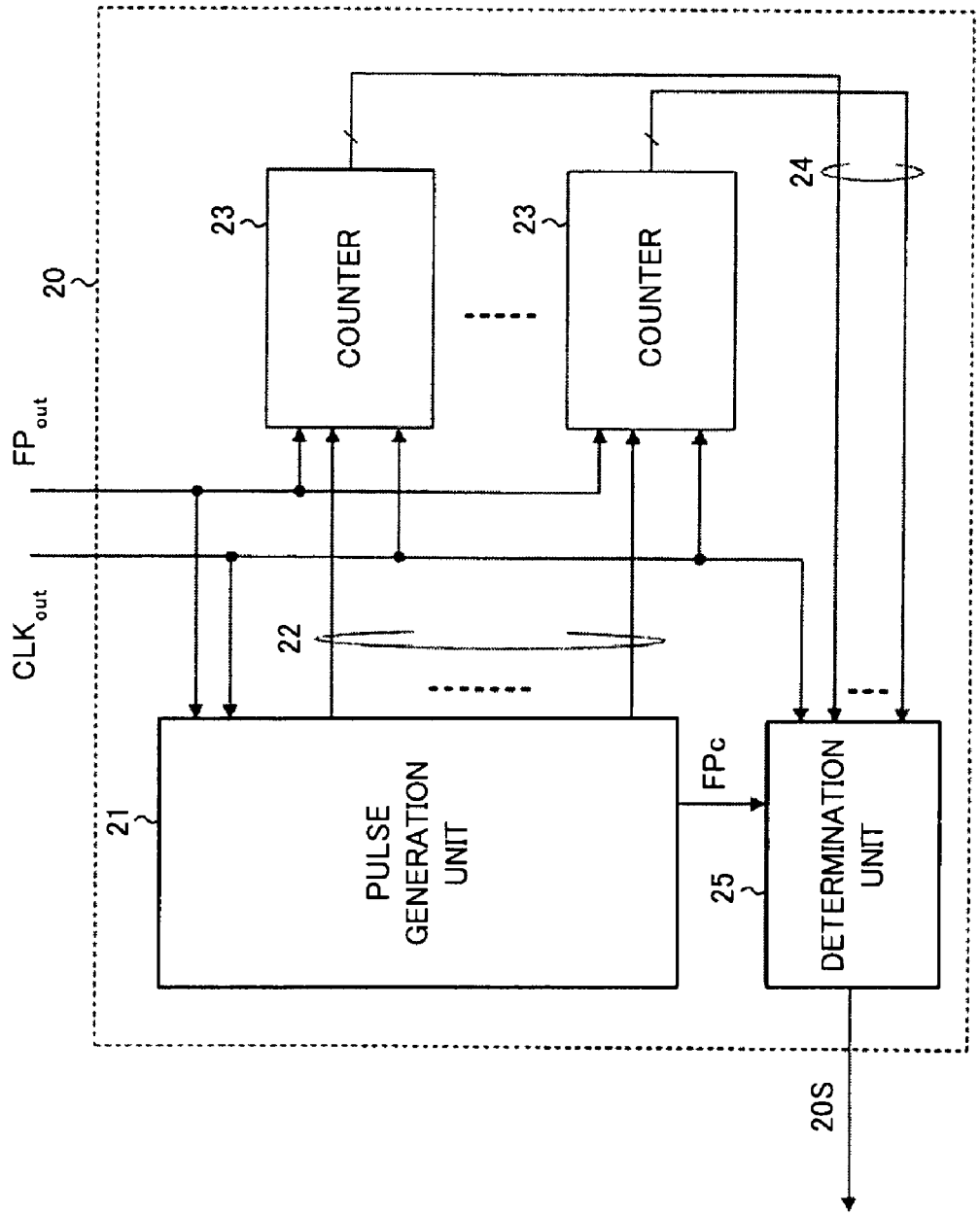
FIG. 4 is a block diagram showing a configuration of a racing detection unit of a frame pulse signal latch circuit according to a second embodiment of the present invention.

Next, a frame pulse signal latch circuit 1 according to a second embodiment of the present invention will be explained with reference to FIG. 4. FIG. 4 is a block diagram showing a configuration of a racing detection unit 20 of the frame pulse signal latch circuit 1 according to the second embodiment of the present invention.

In the present embodiment, a specific example of the racing detection unit 20 will be explained. Other configurations of the frame pulse signal latch circuit 1 are similar to that of the first embodiment. Therefore, detailed explanations thereof are omitted here.

As shown in FIG. 4, the racing detection unit 20 has a pulse generation unit 21, a plurality of counters 23, and a determination unit 25.

The pulse generation unit 21 counts the number of pulses of the output clock signal $CLK_{out}$ over one cycle of the output frame pulse signal $FP_{out}$ output from the latch unit 12. Then, based on the counted result, the pulse generation unit 21 generates a plurality of pulse signals 22, which are at a high level respectively in the periods in which the output frame pulse signal $FP_{out}$ can be at the high level when the racing state is generated, and outputs them to the corresponding counters 23.

Each of the counters 23 counts the number of times that the output frame pulse signal $FP_{out}$ becomes the high level when the input pulse signal 22 becomes the high level and outputs a signal 24 including the count value to the determination unit 25.

Based on the input signals 24, the determination unit 25 determines that the racing state is generated when both of count values in a pair of the counters 23 which are provided to respectively correspond to the pulse signals 22 of which phases are different from each other by the period corresponding to one cycle of the output clock signal $CLK_{out}$ exceed a predetermined number of times. Then, the signal 20S corresponding to the detection result of the racing state is output.

Figure 6A:
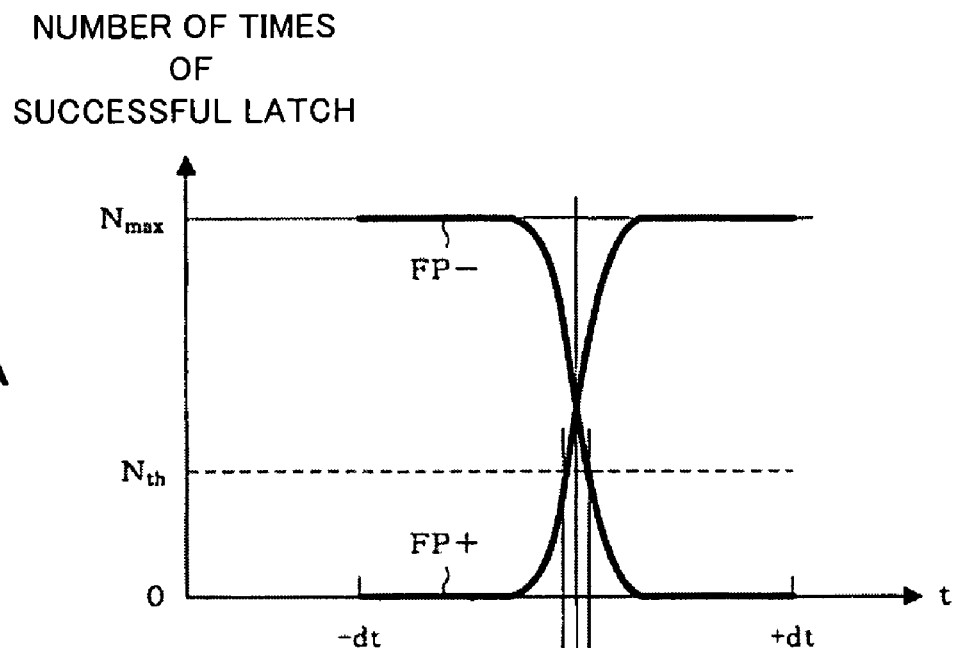
FIG. 6A is a diagram for explaining the relation between phases of frame pulse signals and the number of times of successful latch.
Figure 6B:
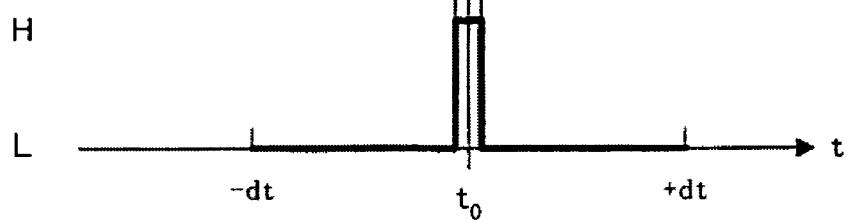
FIG. 6B shows an example of a detection signal that is output when a racing state is detected.

FIG. 5A to FIG. 5D are diagrams for explaining the phase relation between the clock signal CLK and the frame pulse signal FP. FIG. 6A is a diagram for explaining the relation between phases of frame pulse signals and the number of times of successful latch. FIG. 6B shows an example of the signal 20S that is output when the racing state is detected.

As is understood when FIG. 5A to FIG. 5D are taken into consideration, in the racing state in which the decay timing of the frame pulse signal FP is positioned near the rise timing $t_0$ of the clock signal CLK, the latch timing of the frame pulse signal FP is sometimes varied within the periods before and after $t_0$. For example, when the decay timing of the frame pulse signal FP is slightly before the timing $t_0$, the frame pulse signal FP is latched as a frame pulse signal FP− at the rise timing of the clock signal CLK that is the one before $t_0$. On the other hand, when the decay timing of the frame pulse signal FP is slightly after the timing $t_0$, the frame pulse signal FP is latched as a frame pulse signal FP+ at the rise of the clock signal CLK that is the rise at $t_0$.

When the decay timing of the frame pulse signal FP is varied from −dt to +dt around the rise timing $t_0$ of the output clock signal $CLK_{out}$, the number of times of successful latch that the frame pulse signal FP is latched as the frame pulse signal FP− or the frame pulse signal FP+ is distributed as shown in FIG. 6A.

When the decay timing of the frame pulse signal FP is varied from −dt to +dt, the number of times of successful latch begins rapidly decreasing from $N_{max}$ when the decay timing of the frame pulse signal FP approaches $t_0$. Then, by the decay timing of the frame pulse signal FP becomes $t_0$, the number of times of successful latch is decreased by half. Furthermore, at the point when the decay timing of the frame pulse signal FP slightly exceeds $t_0$, the number of times of successful latch becomes approximately zero.

Oppositely, regarding the frame pulse signal FP+, when the decay timing of the frame pulse signal FP approaches $t_0$, the number of times of successful latch begins rapidly increasing from zero. Then, when the decay timing of the frame pulse signal FP slightly exceeds $t_0$, the number of times of successful latch becomes $N_{max}$.

Therefore, the state that the decay timing of the frame pulse signal FP is close to the rise timing $t_0$ of the output clock signal $CLK_{out}$ can be detected by counting the number of times of successful latch as the frame pulse signal FP− and the number of times of successful latch as the frame pulse signal FP+.

Therefore, as is understood from FIG. 6A, the present embodiment focuses on the fact that both the number of times of successful latch as the frame pulse signal FP− and the number of times of successful latch as the frame pulse signal FP+ show values of a certain level in the vicinity of the rise timing $t_0$ of the clock signal CLK. The racing state is determined to be generated when both the number of times of successful latch as the frame pulse signal FP− and the number of times of successful latch as the frame pulse signal FP+ exceed a predetermined threshold value $N_{th}$. In this case, the signal 20S from the determination unit 25 shown in FIG. 6B becomes the high level.

Figure 7:
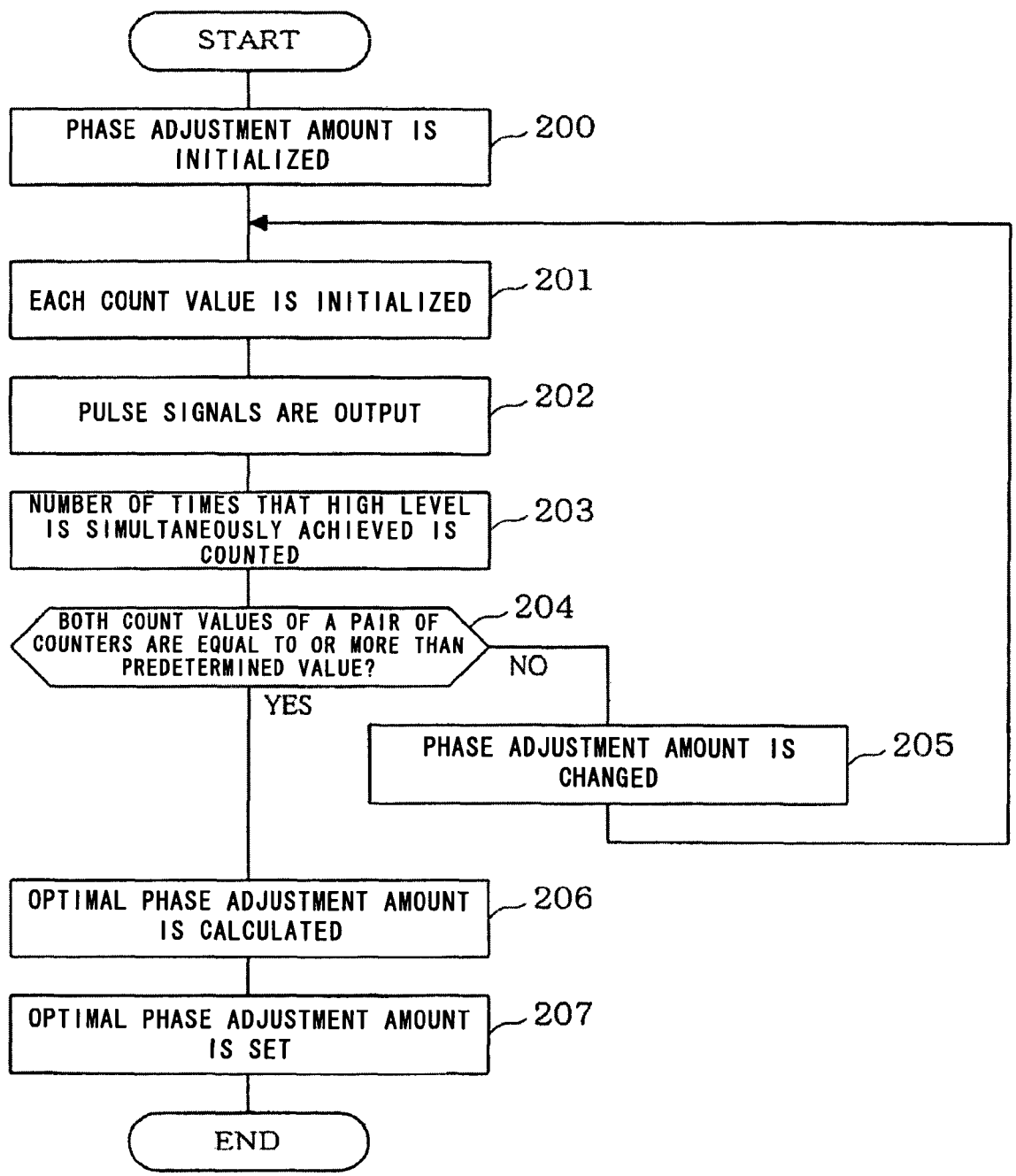
FIG. 7 is a flow chart for explaining an operation of the frame pulse signal latch circuit according to the second embodiment of the present invention.

Next, with referent to FIG. 7, an operation of the frame pulse signal latch circuit 1 according to the second embodiment of the present invention will be explained. FIG. 7 is a flow chart for explaining the operation of the frame pulse signal latch circuit 1 according to the second embodiment of the present invention.

In accordance with an initialization signal (not shown) such as a reset signal indicating start of a phase adjustment operation, the phase control unit 30 outputs the signal 30S including the information that causes the phase adjustment amount to be zero. Consequently, the phase adjustment amount by the phase adjustment unit 11 is set to zero (step 200).

As a result, the output clock signal $CLK_{out}$ having a zero phase-difference with respect to the input clock signal $CLK_{in}$ is output from the phase adjustment unit 11. The latch unit 12 latches the input frame pulse signal $FP_{in}$ by the output clock signal $CLK_{out}$ and outputs the signal as the output frame pulse signal $FP_{out}$.

The pulse generation unit 21 and the counters 23 set count values of their own to zero in accordance with the above described initialization signal (step 201).

Next, when the initially-latched output frame pulse signal $FP_{out}$ is output from the latch unit 12 after start of the phase adjustment operation, the pulse generation unit 21 starts counting the number of pulses of the output clock signal $CLK_{out}$ over one cycle of the output frame pulse signal $FP_{out}$. Then, the plurality of pulse signals 22, which are at the high level respectively in the periods in which the latched output frame pulse signal $FP_{out}$ can be at the high level, are generated and output to the corresponding counters 23 (step 202). Note that the plurality of pulse signals 22 output herein include at least a signal, which is at the high level while the input frame pulse signal is at the high level, and a signal, in which the phase thereof is shifted with respect to the above described signal by the period corresponding to one cycle of the output clock signal $CLK_{out}$.

In this process, if the phase adjustment direction in the phase adjustment unit 11 is the direction that delays the phase of the clock signal, at least the pulse signal 22 that is at the high level while the input frame pulse signal is at the high level and the pulse signal 22 that has the phase delayed with respect to the above described signal by the period corresponding to one cycle of the output clock signal $CLK_{out}$ are output. If the phase adjustment direction in the phase adjustment unit 11 is the direction that advances the phase of the clock signal, at least the pulse signal 22 that is at the high level while the input frame pulse signal is at the high level and the pulse signal 22 that has the phase advanced with respect to the above described signal by the period corresponding to one cycle of the output clock signal $CLK_{out}$ are output.

Note that the signals are not limited to these, and the pulse generation unit 21 may output, in accordance with the phase adjustment amount, a plurality of pulse signals 22 having phases which are shifted by an integral multiple of the period corresponding to one cycle of the output clock signal $CLK_{out}$ with respect to the pulse signal 22 that is at the high level while the input frame pulse signal is at the high level.

Each of the counters 23 compares the output frame pulse signal $FP_{out}$ and the pulse signal 22, which are input thereto, based on the output clock signal $CLK_{out}$. Then, the number of times that the output frame pulse signal $FP_{out}$ and the pulse signal 22 become the high level at the same time is counted, and the signal 24 including the result thereof is output to the determination unit 25 (step 203).

In parallel with the above described operation, the pulse generation unit 21 counts the number of pulses of the output clock signal $CLK_{out}$ as a trigger of the above described initialization signal over one cycle of the output frame pulse signal $FP_{out}$. Then, at the point when the counted number of pulses reaches a predetermined number of frames corresponding to a detection period, the pulse generation unit 21 outputs a determination timing signal FPc, which indicates determination timing.

Based on the output clock signal $CLK_{out}$, the determination unit 25 determines that the racing state is generated when both count values in a pair of the counters 23, which are provided to respectively correspond to the pulse signals 22 having the phases which are mutually different by the period corresponding to one cycle of the output clock signal $CLK_{out}$, exceed a predetermined number of times (step 204).

When the determination timing signal FPc indicating end of the detection period is output in the state in which both the values counted by the above described pair of counters 23 do not reach the predetermined number of times (step 204: NO), the determination unit 25 causes the signal 20S to be at the low level. Corresponding to this, the phase control unit 30 outputs the signal 30S including the information about the target phase adjustment amount, which is obtained by varying the current phase adjustment amount by a predetermined amount. Consequently, the phase adjustment amount in the phase adjustment unit 11 is changed to the target phase adjustment amount (step 205). Subsequently, until the determination in step 204 is affirmed, the processes from step 201 to step 205 are repeated.

Meanwhile, when both the values counted by the above described pair of counters 23 have reached the threshold value (step 204: YES), the determination unit 25 causes the signal 20S to be at the high level. Corresponding to this, the phase control unit 30 calculates an optimal phase adjustment amount based on the current phase adjustment amount in the phase adjustment unit 11 (step 206). Then, the phase control unit 30 outputs the signal 30S including the information about the optimal phase adjustment amount and sets the phase adjustment amount of the phase adjustment unit 11 as the optimal phase adjustment amount (step 207). The phase adjustment unit 11 adjusts the phase of the input clock signal $CLK_{in}$ based on the optimal phase adjustment amount, generates the output clock signal $CLK_{out}$, and outputs the signal. Thus, the series of phase adjustment operations is finished.

As explained above, in the present embodiment, the plurality of pulse signals 22, which are at the high level respectively in the periods in which the output frame pulse signal $FP_{out}$ can be at the high level when the racing state is generated, are generated. Next, for each pulse signal 22, the number of times that the output frame pulse signal $FP_{out}$ becomes the high level when the pulse signal 22 becomes the high level is counted. Then, the racing state is determined to be generated when both the count values in the pair of counters 23 exceed the predetermined number of times. Therefore, the racing state can be reliably detected by the circuit having a comparatively simple configuration.

Third Embodiment

Figure 8:
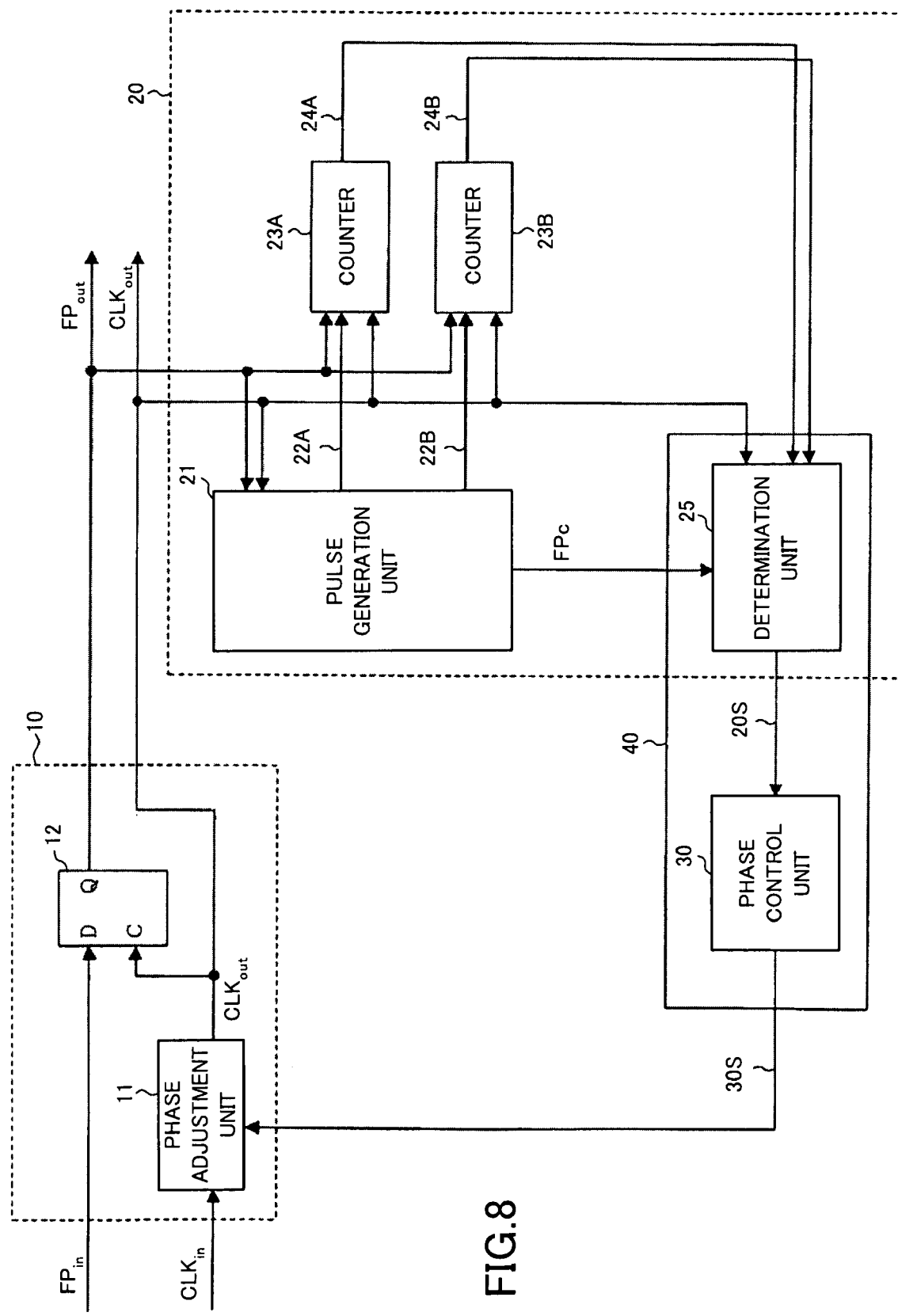
FIG. 8 is a block diagram showing a configuration of a frame pulse signal latch circuit according to a third embodiment of the present invention.
Figure 9:
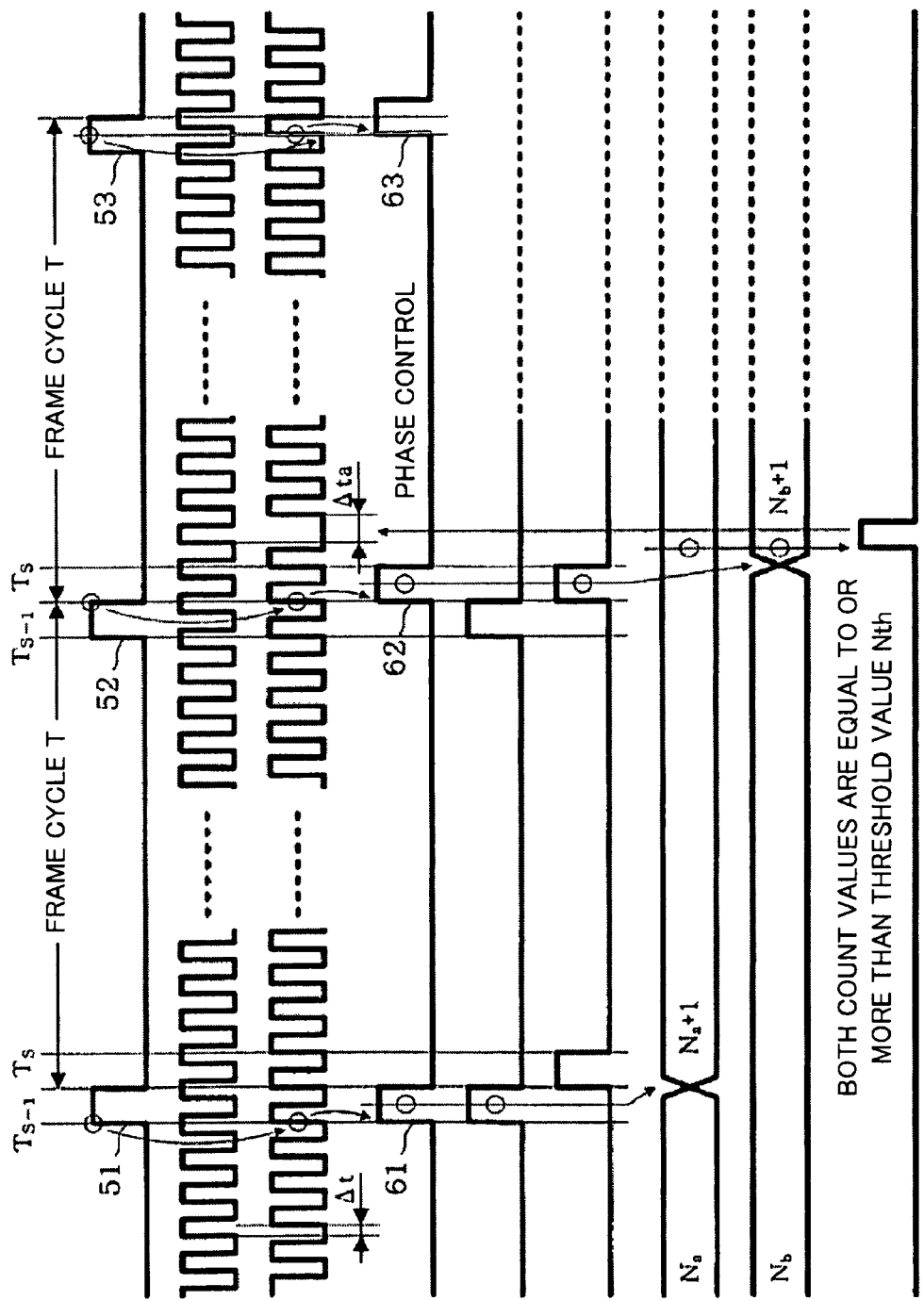
FIG. 9A to FIG. 9I are timing charts for explaining operations of the frame pulse signal latch circuit according to the third embodiment of the present invention.

Next, with reference to FIG. 8 and FIG. 9A to FIG. 9I, a frame pulse signal latch circuit 1 according to a third embodiment of the present invention will be explained. FIG. 8 is a block diagram showing a configuration of the frame pulse signal latch circuit 1 according to the third embodiment of the present invention. Note that the configurations similar to the configurations shown in FIG. 4 are denoted by the same reference numerals. FIG. 9A to FIG. 9I are timing charts for explaining operations of the frame pulse signal latch circuit according to the third embodiment of the present invention.

In the present embodiment, in a case which will be explained, in the racing detection unit 20 according to the second embodiment, the racing state is detected by using a pulse signal 22A, which becomes the high level approximately at the same time when the input frame pulse signal $FP_{in}$ becomes the high level, and using a pulse signal 22B, of which phase is delayed by the period corresponding to one cycle of the output clock signal $CLK_{out}$ with respect to the pulse signal 22A.

In the present embodiment, as shown in FIG. 8, two counters 23A and 23B are provided in the racing detection unit 20. The pulse generation unit 21 generates the above described pulse signal 22A and pulse 22B and outputs them to the counters 23A and 23B, respectively. In the present embodiment, the determination unit 25 and the phase control unit 30 are comprised of one CPU 40.

FIG. 9A to FIG. 9I show the input frame pulse signal $FP_{in}$, which becomes the high level at every frame cycle T, and various signals, which are observed when the input frame pulse signal $FP_{in}$ is latched.

At timing 51 at which the input frame pulse signal $FP_{in}$ initially becomes the high level, the phase adjustment amount in the phase adjustment unit 11 is set to $\Delta t$. Then, the output clock signal $CLK_{out}$ that is delayed by $\Delta t$ with respect to the input clock signal $CLK_{in}$ is output from the phase adjustment unit 11.

Under such phase relation, the latch unit 12 latches the input frame pulse signal $FP_{in}$ based on the output clock signal $CLK_{out}$. Then, the signal is output as the output frame pulse signal $FP_{out}$.

Meanwhile, the pulse generation unit 21 outputs the pulse signal 22A, which becomes the high level approximately at the same time when the input frame pulse signal $FP_{in}$ becomes the high level, and the pulse signal 22B, of which phase is delayed by the period corresponding to one cycle of the output clock signal $CLK_{out}$ with respect to the pulse signal 22A.

When the input frame pulse signal $FP_{in}$ is latched in the vicinity of the rise timing 51 thereof by rise timing of the output clock signal $CLK_{out}$, the output frame pulse signal $FP_{out}$ becomes the high level from the latch timing merely for the period corresponding to one cycle of the output clock signal $CLK_{out}$.

In this case, the output frame pulse signal $FP_{out}$ and the pulse signal 22A become the high level at the same time for the period corresponding to one cycle of the output clock signal $CLK_{out}$. Therefore, a count value $N_a$ is incremented by one by the counter 23A.

Then, when the input frame pulse signal $FP_{in}$ rises at timing 52 and is latched in the vicinity of next decay timing by the rise timing of the output clock signal $CLK_{out}$, the output frame pulse signal $FP_{out}$ becomes the high level from the latch timing for the period corresponding to one cycle of the output clock signal $CLK_{out}$.

In this case, the output frame pulse signal $FP_{out}$ and the pulse signal 22B become the high level at the same time; therefore, a count value $N_b$ is incremented by one by the counter 23B.

The determination unit 25 monitors signals 24A and 24B including the count values output from the counters 23A and 23B and, when both the count values of the counters 23A and 23B reach a threshold value $N_{th}$, causes the signal 20S, which indicates detection of the racing state, to be at the high level.

Based on the signal 20S, the phase control unit 30 calculates an optimal phase adjustment amount $\Delta ta$ based on the current phase adjustment amount $\Delta t$, i.e., the phase adjustment amount by which the racing state is generated. Then, the phase adjustment amount of the phase adjustment unit 11 is set to the optimal phase adjustment amount $\Delta ta$. Consequently, the output clock signal $CLK_{out}$ that is delayed by the optimal phase adjustment amount $\Delta ta$ with respect to the input clock signal $CLK_{in}$ is output from the phase adjustment unit 11. Therefore, the input frame pulse signal $FP_{in}$ thereafter is latched at stable timing.

As explained above, in the present embodiment, the pulse signals 22A and 22B, which become the high level respectively in the periods in which the output frame pulse signal $FP_{out}$ can be at the high level when the racing state is generated, are generated. Next, the number of times that the pulse signal 22A and the output frame pulse signal $FP_{out}$ become the high level at the same time and the number of times that the pulse signal 22B and the output frame pulse signal $FP_{out}$ become the high level at the same time are counted by the counters 23A and 23B. Then, when both the count values in both the counters 23A and 23B exceed the predetermined number of times, the racing state is determined to be generated. Therefore, the racing state can be reliably detected by the circuit having a comparatively simple configuration. The optimal phase adjustment amount can be set based on the racing state.

Fourth Embodiment

Figure 10:
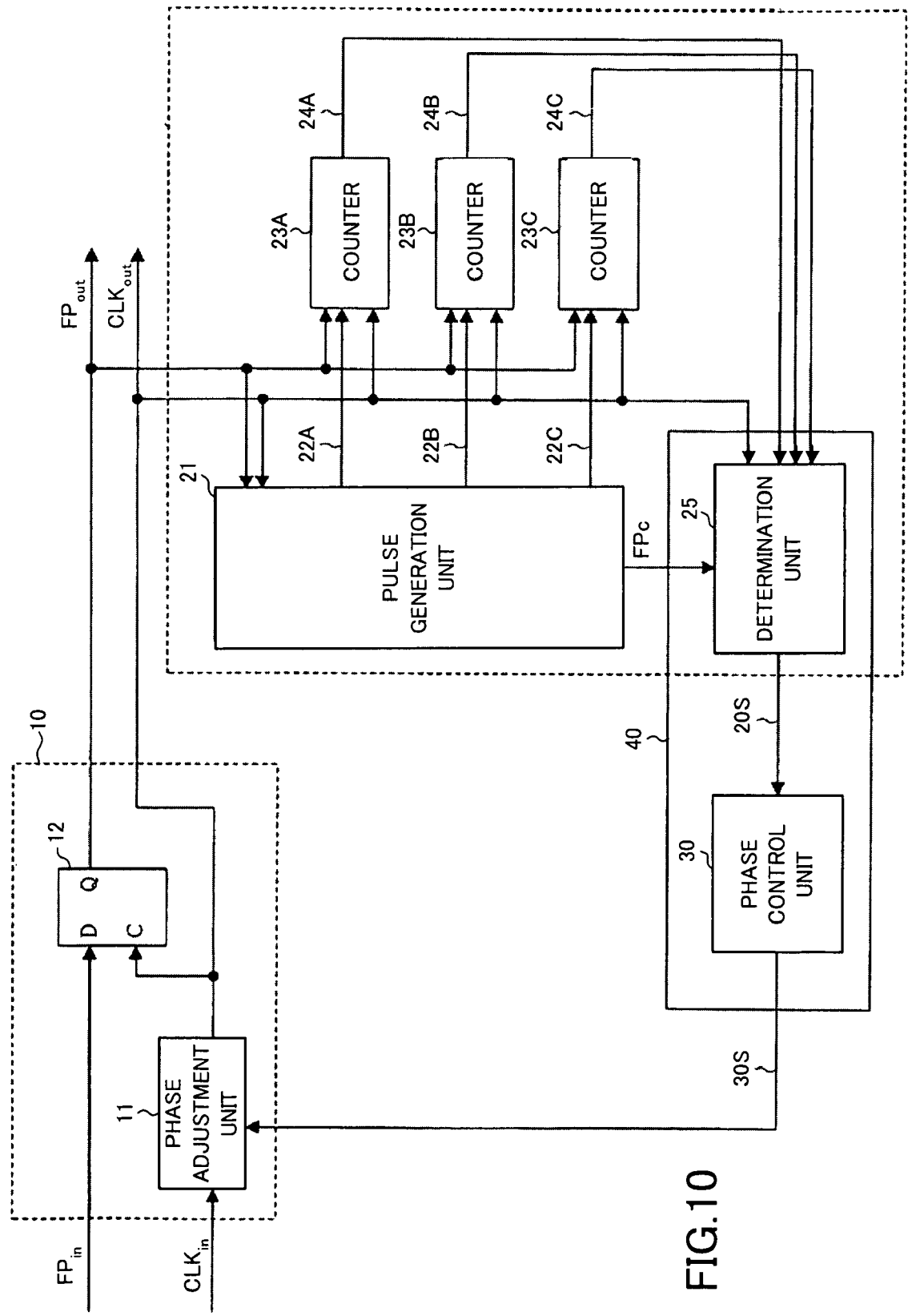
FIG. 10 is a block diagram showing a configuration of the frame pulse signal latch circuit according to a fourth embodiment of the present invention.
Figure 11:
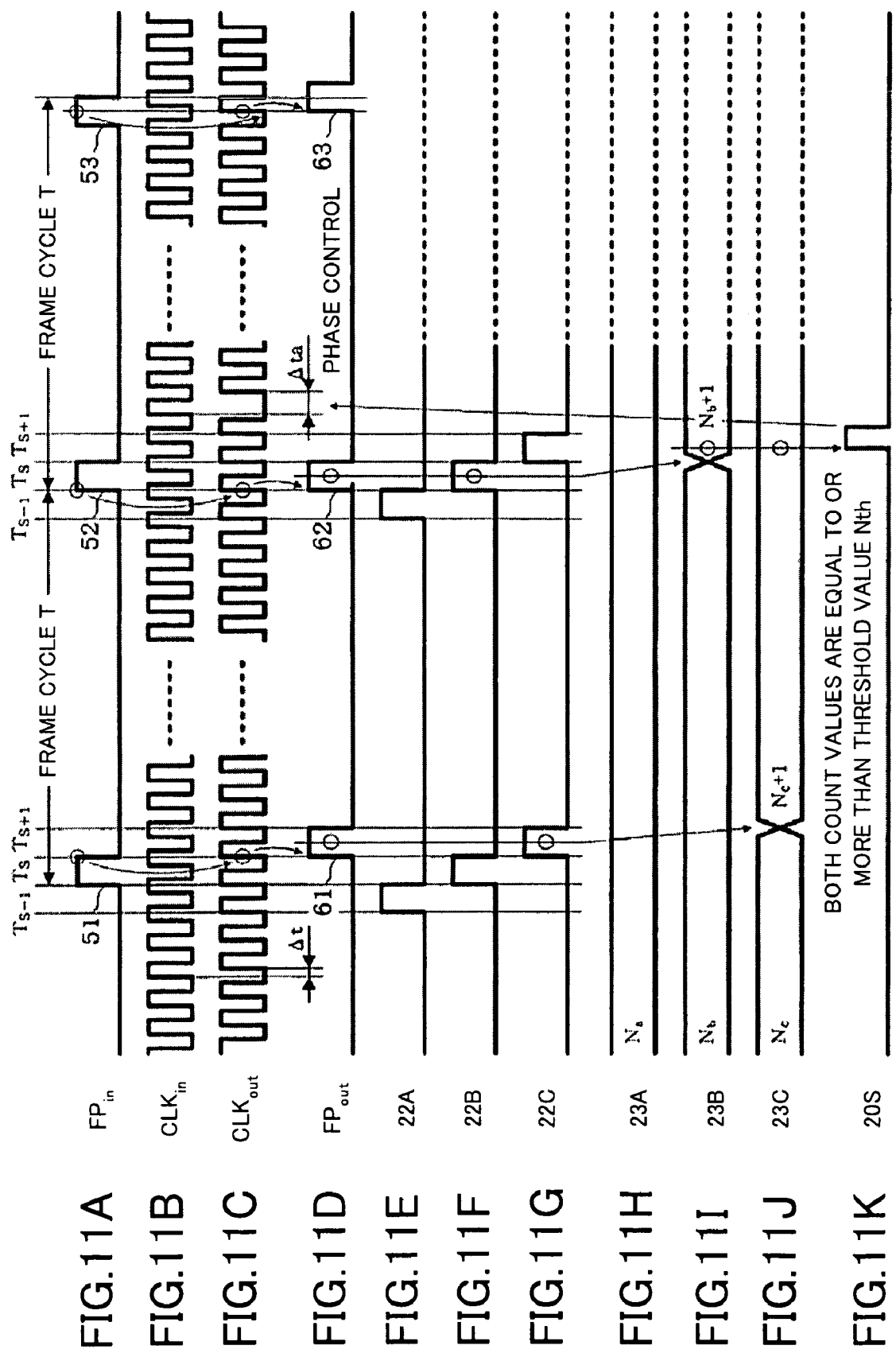
FIG. 11A to FIG. 11K are timing charts for explaining operations of the frame pulse signal latch circuit according to the fourth embodiment of the present invention.

Next, with reference to FIG. 10 and FIG. 11, a frame pulse signal latch circuit 1 according to a fourth embodiment of the present invention will be explained. FIG. 10 is a block diagram showing a configuration of the frame pulse signal latch circuit 1 according to a fourth embodiment of the present invention. Note that the configurations similar to the configurations shown in FIG. 8 are denoted by the same reference numerals. FIG. 11A to FIG. 11K are timing charts for explaining operations of the frame pulse signal latch circuit according to the fourth embodiment of the present invention.

In the present embodiment, in a case which will be explained, in the racing detection unit 20 according to the second embodiment, the racing state is detected by using a pulse signal 22B, which becomes the high level approximately at the same time when the input frame pulse signal $FP_{in}$ becomes the high level, a pulse signal 22A, of which phase is advanced by the period corresponding to one cycle of the output clock signal $CLK_{out}$ with respect to the pulse signal 22B, and a pulse signal 22C, of which phase is delayed by the period corresponding to one cycle of the output clock signal $CLK_{out}$ with respect to the pulse signal 22B.

In the present embodiment, as shown in FIG. 10, three counters 23A, 23B, and 23C are provided in the racing detection unit 20. The pulse generation unit 21 generates the above described pulse signals 22A to 22C and outputs them to the counters 23A to 23C, respectively. In the present embodiment, the determination unit 25 and the phase control unit 30 are comprised of one CPU 40.

FIG. 11A to FIG. 11K show the input frame pulse signal $FP_{in}$, which becomes the high level in every frame cycle T, and various signals, which are observed when the input frame pulse signal $FP_{in}$ is latched.

At the timing 51 at which the input frame pulse signal $FP_{in}$ initially becomes the high level, the phase adjustment amount in the phase adjustment unit 11 is set to $\Delta t$. Then, the output clock signal $CLK_{out}$ that is delayed by $\Delta t$ with respect to the input clock signal $CLK_{in}$ is output from the phase adjustment unit 11.

Under such phase relation, the latch unit 12 latches the input frame pulse signal $FP_{in}$ based on the output clock signal $CLK_{out}$. Then, the signal is output as the output frame pulse signal $FP_{out}$.

Meanwhile, the pulse generation unit 21 outputs the pulse signal 22B, which becomes the high level approximately at the same time when the input frame pulse signal $FP_{in}$ becomes the high level, the pulse signal 22A, of which phase is advanced by the period corresponding to one cycle of the output clock signal $CLK_{out}$ with respect to the pulse signal 22B, and the pulse signal 22C, of which phase is delayed by the period corresponding to one cycle of the output clock signal $CLK_{out}$ with respect to the pulse signal 22B.

When the input frame pulse signal $FP_{in}$ rises at the timing 51 and is latched in the vicinity of next decay timing by the rise timing of the output clock signal $CLK_{out}$, the output frame pulse signal $FP_{out}$ becomes the high level from the latch timing for the period corresponding to one cycle of the output clock signal $CLK_{out}$.

In this case, the output frame pulse signal $FP_{out}$ and the pulse signal 22C become the high level at the same time for the period corresponding to one cycle of the output clock signal $CLK_{out}$. Therefore, a count value $N_c$ is incremented by one by the counter 23C.

Then, when the input frame pulse signal $FP_{in}$ rises at timing 52 and is latched in the vicinity of the timing thereof by rise timing of the output clock signal $CLK_{out}$, the output frame pulse signal $FP_{out}$ becomes the high level from the latch timing for the period corresponding to one cycle of the output clock signal $CLK_{out}$.

In this case, the output frame pulse signal $FP_{out}$ and the pulse signal 22B become the high level at the same time; therefore, a count value $N_b$ is incremented by one by the counter 23B.

The determination unit 25 monitors signals 24B and 24C, which are output from the counters 23B and 23C and include the count values, and, when both the count values of the counters 23B and 23C reach a threshold value $N_{th}$, causes the signal 20S, which indicates detection of the racing state, to be the high level.

Based on the signal 20S, the phase control unit 30 calculates an optimal phase adjustment amount $\Delta ta$ based on the current phase adjustment amount $\Delta t$, i.e, the phase adjustment amount in which the racing state is generated. Then, the phase adjustment amount of the phase adjustment unit 11 is set as the optimal phase adjustment amount $\Delta ta$. Consequently, the output clock signal $CLK_{out}$ that is delayed by the optimal phase adjustment amount $\Delta ta$ with respect to the input clock signal $CLK_{in}$ is output from the phase adjustment unit 11. Therefore, the input frame pulse signal $FP_{in}$ thereafter is latched at stable timing.

As explained above, in the present embodiment, the pulse signals 22A to 22C, which become the high level respectively in the periods in which the output frame pulse signal $FP_{out}$ can be the high level when the racing state is generated, are generated. Next, the number of times that the pulse signal 22A and the output frame pulse signal $FP_{out}$ become the high level at the same time, the number of times that the pulse signal 22B and the output frame pulse signal $FP_{out}$ become the high level at the same time, and the number of times that the pulse signal 22C and the output frame pulse signal $FP_{out}$ become the high level at the same time are counted by the counters 23A, 23B, and 23C. Then, when both the count values in the counter 23A and the counter 23B or both the count values in the counter 23B and the counter 23C exceed a predetermined number of times, the racing state is determined to be generated. Therefore, the racing state can be reliably detected by the circuit having a comparatively simple configuration. The optimal phase adjustment amount can be set based on the racing state.

Fifth Embodiment

Figure 12:
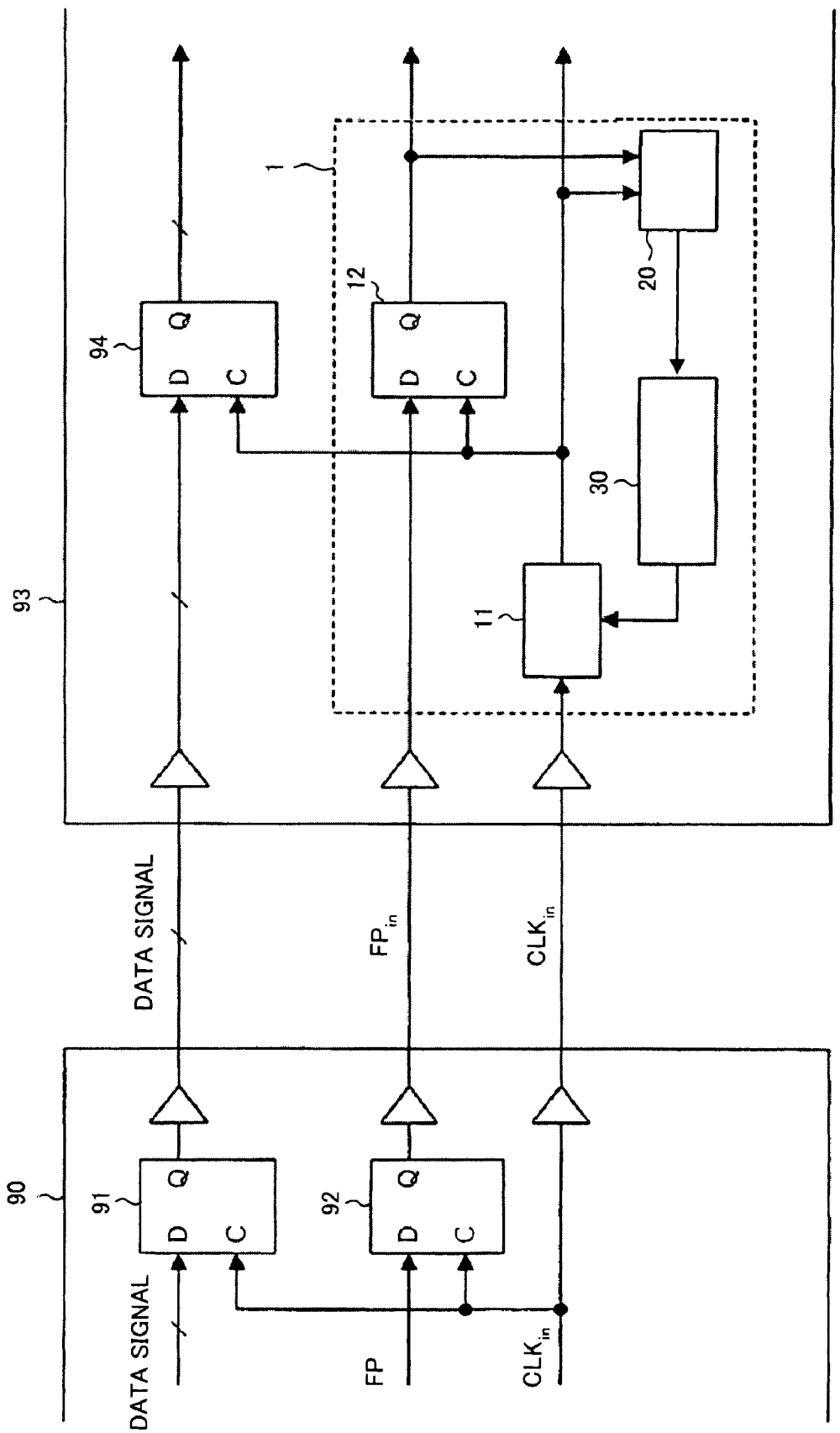
FIG. 12 is a block diagram for explaining a fifth embodiment of the present invention.

The above described embodiments are explained by taking the case in which frame pulses are transmitted between different printed wiring boards or devices as an example. The present invention can be also applied to the case in which a plurality of data signals are transmitted. Hereinafter, a fifth embodiment of the present invention will be explained. FIG. 12 is a block diagram for explaining the fifth embodiment of the present invention.

In the present embodiment, in a transmitting-side unit 90, n data signals and a frame pulse FP are latched based on a input clock signal $CLK_{in}$ by two latch circuits 91 and 92, respectively. Then, the n data signals, the input frame pulse $FP_{in}$, and the input clock signal $CLK_{in}$ are transmitted to a unit 93 of a receiving side.

In the receiving-side unit 93, based on an output clock signal $CLK_{out}$, which has undergone phase adjustment in the phase adjustment unit 11 of the frame pulse signal latch circuit 1 of the present invention, the input frame pulse $FP_{in}$ is latched by the latch unit 12 and output therefrom. The data signals are latched by a latch circuit 94 and output therefrom. Thus, the plurality of data signals can be precisely latched and output by the output clock signal $CLK_{out}$ having the phase that has been optimized in the frame pulse latch circuit 1.

The third and fourth embodiments have been explained by taking the case in which two or three counters are used as an example. However, the present invention is not limited thereto, and the number of times that the pulse signals and the output frame pulse become the high level at the same time may be counted by using four or more counters.

In the third and fourth embodiments, the determination unit 25 of the racing detection unit 20 and the phase control unit 30 are comprised of one CPU 40. As a result, the circuit configuration of the frame pulse signal latch circuit 1 can be simplified. Note that the determination unit 25 and the phase control unit 30 may be comprised of, for example, dedicated circuits.

In the above described embodiments, the racing state is generated by varying the phase of the input clock signal. The present invention is not limited thereto; and, for example, when a time constant, and the like, of a circuit are varied due to, for example, change of the environment or the like and the racing state is generated, the phase adjustment amount can be set so that the phase of the output clock signal at this point is varied by the period corresponding to half a cycle.

In the above described embodiments, the phase of the input clock signal is varied based on the signal from the phase control unit so as to generate the racing state. This is not requisite, and the phase adjustment unit may independently vary the phase of the input clock signal.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A frame pulse signal latch circuit comprising:
   a racing detection unit which detects a racing state generated due to phase relation between a frame pulse signal and a first clock signal for latching the frame pulse signal;
   a phase control unit which determines a phase adjustment amount for adjusting a phase of the first clock signal based on the phase and cycle of the first clock signal when the racing state is detected by the racing detection unit;
   a phase adjustment unit which generates the first clock signal by adjusting a phase of an input second clock signal in accordance with the phase adjustment amount determined by the phase control unit; and
   a latch unit which latches the frame pulse signal based on the first clock signal generated by the phase adjustment unit and generates an output frame pulse signal,
   wherein the racing detection unit comprises:
   a pulse generation unit, which generates a first pulse signal, which becomes a high level in a period in which the output frame pulse signal can become the high level when the racing state is generated, and a second pulse signal, which has a phase different from a phase of the first pulse signal by the period corresponding to one cycle of the first clock signal;
   a first counter, which counts the number of times that the output frame pulse signal becomes the high level when the first pulse signal is at the high level;
   a second counter, which counts the number of times that the output frame pulse signal becomes the high level when the second pulse signal is at the high level; and
   a determination unit, which determines that the racing state is generated when count values of both the first counter and the second counter are equal to or more than a predetermined value.

2. The frame pulse signal latch circuit according to claim 1, wherein
   the pulse generation unit generates, other than the second pulse signal, a plurality of pulse signals, wherein each of the plurality of pulse signals becomes a high level in a period in which the output frame pulse signal can become the high level and has a phase difference from the first pulse signal being an integral multiple of one cycle of the first clock signal;
   a plurality of counters, wherein each of the plurality of counters counts the number of times that the output frame pulse signal becomes the high level when the pulse signal becomes the high level, are further provided; and
   the determination unit determines that the racing state is generated when both count values of a pair of the counters respectively corresponding to a pair of the pulse signals having the phase mutually different by the period corresponding to one cycle of the first clock signal are equal to or more than a predetermined value.

3. The frame pulse signal latch circuit according to claim 1, wherein the phase control unit determines the phase adjustment amount so that the phase of the first clock signal of the moment when the racing state is detected by the racing detection unit is shifted by the period corresponding to half a cycle of the first clock signal.

4. The frame pulse signal latch circuit according to claim 1, wherein the phase adjustment unit generates the first clock signal while varying the phase of the second clock signal so as to generate the racing state.

* * * * *